Figure 1:
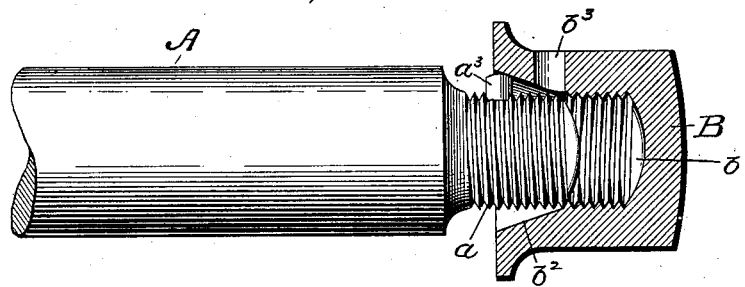

(No Model.)

D. HOGAN.
NUT LOCK.

No. 599,783.    Patented Mar. 1, 1898.

WITNESSES:
L. S. Elliott
R. M. Elliott

INVENTOR:
Daniel Hogan,
by R. S. Dyrenforth,
his attorney.

UNITED STATES PATENT OFFICE.

DANIEL HOGAN, OF PALATKA, FLORIDA, ASSIGNOR OF ONE-HALF TO THOMAS PALMER AND M. B. MACFARLANE, OF HILLSBOROUGH COUNTY, FLORIDA.

NUT-LOCK.

SPECIFICATION forming part of Letters Patent No. 599,783, dated March 1, 1898.

Application filed May 3, 1897. Serial No. 634,906. (No model.)

*To all whom it may concern:*

Be it known that I, DANIEL HOGAN, a citizen of the United States, residing at Palatka, in the county of Putnam and State of Florida, have invented certain new and useful Improvements in Nut-Locks; and I do hereby declare the following to be a full, clear, and exact description of the invention, such as will enable others skilled in the art to which it appertains to make and use the same.

This invention relates to nut-locks.

The object is to produce a nut-lock in which when the nut is once in place it will be absolutely impossible for the same to work loose, as from jars or vibrations incident to use, and in which its removal, when desired, may be effected in an easy and ready manner, to provide a nut-lock which, while being certain and effective in use, will be exceedingly simple of construction, easy to repair in case of injury, cheap to produce, and of ready adaptation to position for use.

In a nut-lock characterized by my invention I provide the threaded portion of the bolt with a recess, in which is seated a spring-pressed locking-pin adapted normally to extend above the plane of the threads. The nut may be of any desired construction and of any shape and may have the threaded opening extending entirely through it or only a portion of the way through it to form a threaded cap, such as is used on some forms of wagon-axles. The threaded bore of this nut is enlarged at that end which will be the inner end in use, to form a cone-shaped continuation of the bolt-opening, the walls whereof operate automatically to seat the locking-pin when the nut is screwed to its seat, and at a point in the nut which will be over the locking-pin when the nut is seated I provide an aperture, into which the pin will spring and thereby hold the nut from turning. In order to remove the nut, it will only be necessary to insert a suitably-shaped tool, as a pin-wrench or any other piece of metal that may be pushed into engagement with the pin, so as to depress the same to free it from the walls of the aperture. The nut is then turned to the left or to the right, as the case may be, according to the trend of the threads on the bolt, to bring the pin against the solid portion of the nut, and upon further turning the nut may be removed without interference from the pin, as the nut will be moved a sufficient distance on the threaded portion of the bolt by a single turn to leave the locking-pin removed some distance from the aperture in the nut when this aperture again comes to the point occupied when in locked position.

Bolts have heretofore been provided with spring-pressed locking-pins similar to that shown, and nuts have also been provided with apertures to be engaged by the pin when seated; but the salient and important difference between these constructions and that of my invention is that the cone-shaped continuation of the bolt-opening in the nut operates automatically to force the pin to its seat against stress of the spring in the act of seating the nut, whereas in the constructions similar to this that have heretofore been employed the pin had to be held down by some means until the nut was seated or brought to the position to permit of the locking-pin engaging the aperture provided for the purpose.

The invention consists in the novel construction and arrangement of parts of a nut-lock, as will be hereinafter fully described and claimed.

In the accompanying drawings, forming a part of this specification, and in which like letters of reference indicate corresponding parts, I have illustrated a form of embodiment of my invention as applied to a wagon-axle, although it is to be understood that it may be adapted to any other use desired without departing from the spirit of the invention, and in these drawings—

Figure 2:
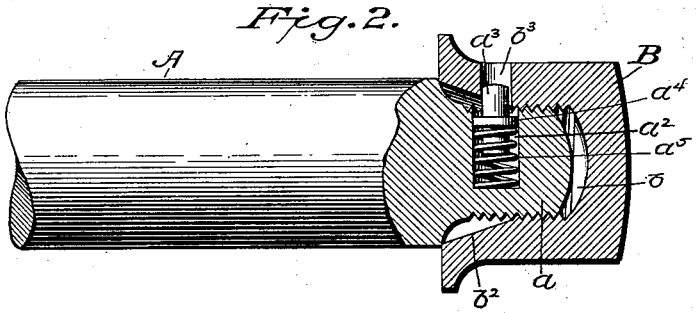
Figure 3:
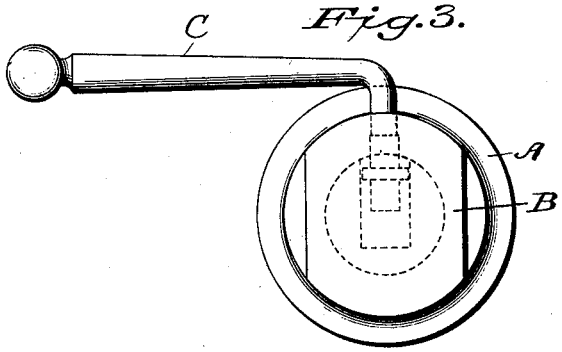

Figure 1 is a view in side elevation, partly in section, showing the nut about to be seated. Fig. 2 is a similar view showing the nut seated, and Fig. 3 is an end view displaying the manner in which the nut is released.

Referring to the drawings, A designates in this instance an axle-spindle, although it may represent a bolt, such as is ordinarily used on a railway fish-plate, it being understood that the adaptation of this invention to any kind of bolt or threaded projection necessitates only the provision of a locking-pin. The spindle is provided with the ordinary threaded portion $a$, in which is formed a recess $a^2$, which when in a spindle will be on the upper side thereof, so as to prevent the locking-pin $a^3$ from dropping out when the nut is removed. The locking-pin may be of any preferred shape, preferably one having a collar or circumferential flange $a^4$ intermediate of its ends, against which bears a spring $a^5$, seated in the recess $a^2$ and operating normally to force the locking-pin upward. The nut B in this instance is shown as an ordinary cup-nut—that is to say, one in which the bolt-opening only extends a portion of the way therethrough, it being understood, however, that the bolt-opening may extend all the way through and still operate as effectively as that form shown. The bolt-opening $b$ of this nut is threaded for a portion of its length and then merges into a cone-shaped unthreaded continuation $b^2$ of the said bolt-opening, the extreme diameter of which is sufficient to embrace or bear upon the locking-pin $a^3$ when the nut is to be seated and thereby force this pin to its seat and hold it there until the nut is turned a sufficient distance to bring an aperture $b^3$ in the nut over the locking-pin, when the latter will spring into this aperture and thereby securely lock the nut against turning. When the nut is to be removed, a suitable instrument may be inserted in the aperture $b^3$ to depress the pin and bring it below the walls of the bolt-opening, and the nut may be then readily detached. The instrument for depressing the pin may be an ordinary pin-wrench C, such as shown, or any suitable piece of metal that will enter the aperture $b^3$.

It will be observed by reference to the drawings that the cone-shaped unthreaded continuation of the bolt-opening $b$ extends from the forward wall of the aperture $b^3$ to the inner face of the nut. The object of this arrangement is to present a perfectly smooth surface to the pin $a^3$ when the nut is being seated, so as to prevent injury to the threads of the nut and also any interference between the threads of the same and the pin. As before stated, the extreme diameter of the cone-shaped portion of the bolt-opening is sufficient to embrace the pin $a^3$ when the nut is being seated, so that the depression of this pin is entirely automatic, thereby rendering it absolutely unnecessary primarily to depress the pin to bring it into position to be engaged by the walls of the cone-shaped portion of the bolt-opening.

It is to be understood that I may provide a number of apertures in the nut, so as to permit of the nut being tightened up, or I may cut a slot in the threaded portion of the bolt, forming a continuation of the recess $a^2$, for the same purpose, and as either of these slight changes in the parts will be perfectly obvious any illustration of the same is deemed unnecessary.

It will be seen from the above description that this form of nut-lock, while being extremely simple of construction, will be found of high efficiency in use and that it may be adapted to wagon-axles in use without requiring any change in their construction other than to provide the axle with a recess to receive the locking-pin and to turn out the bolt-opening in the nut to present the cone-shaped continuation thereof shown.

Having thus fully described my invention, what I claim as new, and desire to secure by Letters Patent of the United States, is—

1. The combination with a bolt having its threaded portion provided with a locking-pin, of a nut having a portion of the length of its bolt-opening threaded for engaging the threaded portion of the bolt, and the remaining portion of the bolt-opening cone-shaped and devoid of threads and provided with an aperture, the said cone-shaped portion of the bolt-opening being adapted automatically to depress the locking-pin when the nut is being seated, substantially as described.

2. The combination with a bolt having its threaded portion provided with a spring-pressed locking-pin, of a nut having a portion of the length of its bolt-opening threaded for engaging the threaded portion of the bolt, and the remaining portion of the bolt-opening cone-shaped and devoid of threads and provided with an aperture, the said cone-shaped portion of the bolt-opening extending from the forward wall of the aperture to the inner face of the nut and being adapted automatically to depress the locking-pin when the nut is being seated, substantially as described.

In testimony whereof I affix my signature in presence of two witnesses.

DANIEL HOGAN.

Witnesses:
JOSEPH PRICE,
M. I. COXE.